(12) United States Patent
Abraham

(10) Patent No.: US 7,661,748 B2
(45) Date of Patent: Feb. 16, 2010

(54) APPARATUS FOR PREVENTING TRANSFER OF ODORS FROM A VEHICLE TO A HUNTER

(76) Inventor: Tim Abraham, 700 E. Union Ct., Broken Arrow, OK (US) 74011

( * ) Notice: Subject to any disclaimer, the term of this patent is extended or adjusted under 35 U.S.C. 154(b) by 189 days.

(21) Appl. No.: 11/871,756

(22) Filed: Oct. 12, 2007

(65) Prior Publication Data

US 2009/0096261 A1    Apr. 16, 2009

(51) Int. Cl.
   *B62D 25/20*   (2006.01)
(52) U.S. Cl. .................................................. 296/97.23
(58) Field of Classification Search ............. 296/97.23; 297/229, 219.1, 228.1, 218.1, 218.2
   See application file for complete search history.

(56) References Cited

U.S. PATENT DOCUMENTS

| | | | | |
|---|---|---|---|---|
| 1,744,004 A | * | 1/1930 | Hunt | 361/217 |
| 1,781,034 A | * | 11/1930 | Russell | 297/229 |
| 4,886,697 A | * | 12/1989 | Perdelwitz et al. | 428/192 |
| 5,122,401 A | | 6/1992 | Finkelstein | |
| 5,294,166 A | * | 3/1994 | Shapland | 296/97.23 |
| 5,383,236 A | | 1/1995 | Sesselmann | |
| 5,539,930 A | | 7/1996 | Sesselmann | |
| 5,790,987 A | | 8/1998 | Sesselmann | |
| 5,806,925 A | * | 9/1998 | Hanley | 297/229 |
| 5,840,122 A | | 11/1998 | Williams | |
| 6,009,559 A | | 1/2000 | Sesselmann | |
| 6,134,718 A | | 10/2000 | Sesselmann | |
| 6,546,594 B1 | | 4/2003 | Wills | |
| 6,655,735 B1 | * | 12/2003 | Learning | 297/228.1 |
| 6,659,551 B1 | * | 12/2003 | Arenas | 297/229 |
| 6,971,716 B2 | * | 12/2005 | DePaulis et al. | 297/229 |
| 2002/0146383 A1 | * | 10/2002 | Johnson | 424/76.1 |
| 2004/0251082 A1 | | 12/2004 | Corbitt | |
| 2006/0010652 A1 | | 1/2006 | Kellaher | |
| 2006/0171998 A1 | | 8/2006 | Trimble | |
| 2006/0230576 A1 | | 10/2006 | Meine | |

* cited by examiner

*Primary Examiner*—H Gutman
(74) *Attorney, Agent, or Firm*—Sturm & Fix LLP

(57) ABSTRACT

An apparatus for preventing transfer of odors from a vehicle to a hunter from a self propelled vehicle has at least one seat, a floorboard and a steering wheel. A cover for the seat, and/or floor mat and/or steering wheel has a vapor barrier to prevent odors from the seat, and/or floor mat and/or steering wheel from passing therethrough, and a material such as silk or RAYON® disposed on top of the vapor barrier of the seat, and/or floor mat and/or steering wheel which is free of any substance foreign to it that would have an odor associated with it, or it can be treated with an odor absorbing substance, or it can be treated with a "cover scent" such as acorn or earth/dirt scent which would be transferred to the hunter's hands and/or clothing and/or boots. Alternatively, a scent absorbing layer, such as a SCENT LOK® layer, can be disposed under the vapor barrier.

19 Claims, 2 Drawing Sheets

APPARATUS FOR PREVENTING TRANSFER OF ODORS FROM A VEHICLE TO A HUNTER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

1. Field of the Invention

The present invention relates generally to an apparatus for preventing transfer of odors from a vehicle to a hunter and more particularly to such an apparatus which is useful for any one or all of a seat, a floor mat or a steering wheel.

2. Background Art

Big game animals, such as deer, have a keen sense of sight, hearing and smell. So when hunting for big game, a hunter needs to take into account all of these keen senses for a successful hunt. In particular, any smells that do not naturally occur in the habitat of the big game will immediately be sensed by such animals and will alert them that danger is near. Hunters typically try to hunt downwind of the animals that they are hunting, but it is inevitable that some of the animals will be upwind from the hunter at times. In fact, the oldest and wisest big game animals often intentionally move from place to place into the wind so that they can use their noses to sense danger ahead of them. So for an optimum chance to bag a big game animal, a hunter hunting for these animals need to keep their bodies and clothing clean and free of odors not found in the woods in which the hunter is hunting.

Beside the obvious steps of taking a shower or bath with soaps and shampoos which do not have a perfume or unnatural scent in them, washing their hunting clothing with unscented soap and avoiding contact with items or solutions that will transfer odors to their bodies or clothing, hunters sometimes wear SCENT LOK® clothing, for example, in order to keep odors from transferring outside of their hunting clothing. This SCENT LOK® clothing is shown in U.S. Pat. Nos. 6,134,718; 6,009,559; 5,790,987; 5,399,030; and 5,383,236, which are all incorporated herein by reference in their entirety. This SCENT LOK® layer can, for example, be an agent being provided in the base layer which is selected from a group consisting of activated charcoal, chlorophyll, baking soda, activated alumina, soda lime, zeolite, calcium oxide, and potassium permanganate.

When in the woods hunters use "scent removal liquids", usually sprayed onto their clothing or skin in an attempt to eliminate odors.

Hunters also use "cover scents" that smell like things normally occurring in the woods, like acorn, earth or dirt, apple and some animal urines, such as fox urine.

Hunters also us "attracting scents" such as urine from an animal like the one they are hunting, like whitetail deer, mule deer, elk, etc. When the animal being hunted smells these urine smells, they often move towards the direction from which such smells emanate.

Simple economics requires that hunters use their vehicles for many purposes besides hunting, because a typical hunter cannot afford to dedicate one vehicle for hunting only. Every person has different a different situation in their lives that causes odors not common to the woods to be in their vehicles. The odors could come from something related to their occupation. Odors could come from children who come in contact with and bring with them many things that could have an odor. Simply having a vehicle serviced or repaired could introduce an oil or gasoline smell to the seats, floor mat and steering wheel, for example. Use by a spouse or friend that is wearing perfume could create a problem.

So when a hunter gets into his or her vehicle with odor free clothing, clean hands and clean boots, it is a problem for that hunter if odors are transferred from the vehicle seats, floor mat and/or steering wheel to the hunter or the hunter's clothing or boots.

BRIEF SUMMARY OF THE INVENTION

The present invention relates to an apparatus for preventing transfer of odors from a vehicle to a hunter from a self propelled vehicle has at least one seat, a floorboard and a steering wheel. A cover for the seat, and/or floor mat and/or steering wheel has a vapor barrier to prevent odors from the seat, and/or floor mat and/or steering wheel from passing therethrough, and a material such as silk or RAYON® brand cloth which is a trademark for a semi-synthetic fiber composed of regenerated cellulose, disposed on top of the vapor barrier of the seat, and/or floor mat and/or steering wheel which is free of any substance foreign to it that would have an odor associated with it, or it can be treated with an odor absorbing substance, or it can be treated with a "cover scent" such as acorn or earth/dirt scent which would be transferred to the hunter's hands and/or clothing and/or boots. Alternatively, a scent absorbing layer, such as a SCENT LOK® layer, can be disposed under the vapor barrier.

An object of the invention is to prevent the transfer of odors, of a type that would be unnatural to woods to be hunted, from a vehicle to a hunter that is using a self propelled vehicle.

Other objects, advantages, and novel features of the present invention will become apparent from the following detailed description of the invention when considered in conjunction with the accompanying drawings.

BRIEF DESCRIPTION OF THE DRAWINGS

These and other attributes of the invention will become more clear upon a thorough study of the following detailed description of the invention, particularly when reviewed in conjunction with the following drawing figures, wherein.

DETAILED DESCRIPTION OF THE INVENTION

Figure 1:
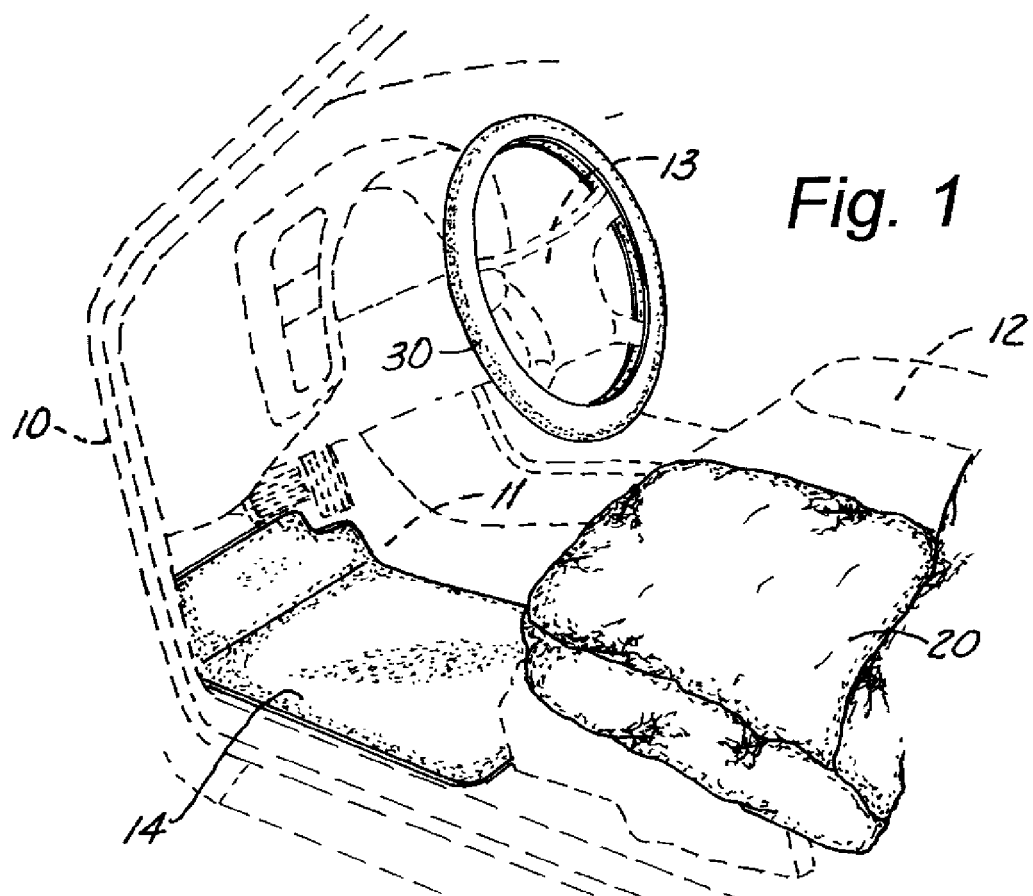
FIG. 1 is a perspective view of the present invention installed in a vehicle to be used for transportation to a place for a hunter to go hunting.
Figure 2:
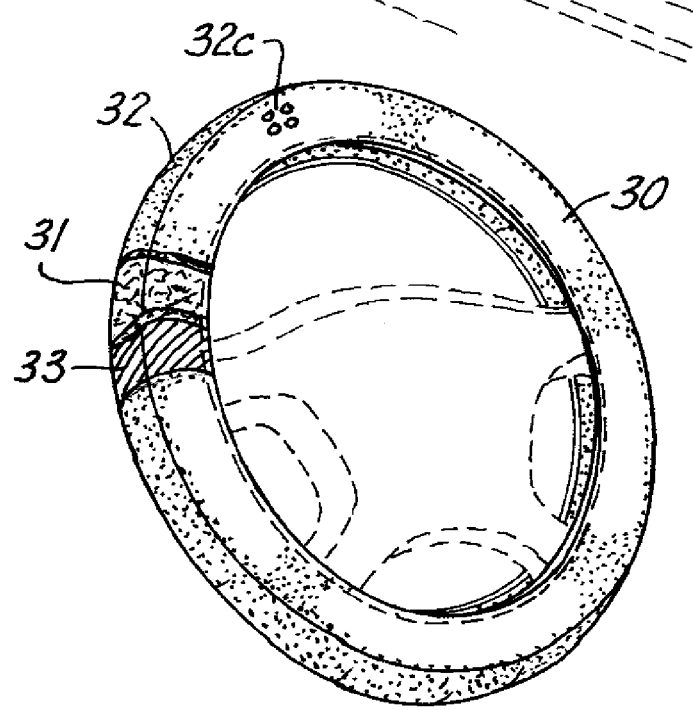
FIG. 2 is a perspective view of a steering wheel cover aspect of the present invention installed in a vehicle.

Referring now to the drawings, wherein like reference numerals designate identical or corresponding parts throughout the several views, FIG. 1 shows a self propelled vehicle 10, such as an internal combustions engine powered truck or automobile, having a floorboard 11, seat 12 and steering wheel 13 covered with the present invention.

The floorboard 11 has a floorboard cover 14, the seat 12 has a seat cover 20 and the steering wheel 13 has a steering wheel cover 30, each of the floorboard cover 14, the seat cover 20 and the steering wheel cover 30 of the present invention can be a two or three or more layer cover as explained below. The lower layer shown in the drawings for each of the seat cover 20 and the steering wheel cover 30 and the floorboard cover 14 is the layer that can be omitted, the top two layers being an essential part of the present invention.

The seat cover 20 includes a seat vapor barrier such as wherein the polyethelene is preferably TUTUFF® polyethelene, TUTUFF® being cross-laminated virgin poly sheeting, made from high density resins. 21 over the top and front side of the seat 12 to prevent odors from the seat 12 to pass therethrough to a person sitting on the seat 12. A top layer 22 is preferably made of a material such as silk or RAYON® which will accept liquid or atomized sprays such as a cover scent such a acorn or earth/dirt scents, or merely a sanitizing spray which eliminates odors, such as indicated by numeral 22c, "c" standing for the word "coating". While only three droplets of spray 22c are shown in the drawings it is understood that preferably the entire top surface of layer 22 has the droplets 22c on it. Furthermore, the droplets 22c as shown in the drawings are greatly enlarged for illustrative purposes, wherein, in fact they would ideally be so small that they could not be seen with the naked eye. Cotton, for example would not be as suitable because it would absorb the coating 22c and would absorb other smells, odors and liquids that might be accidentally spilled thereon.

Optionally, a lower seat layer 23 would ideally be a SCENT LOK® type of material, such as the type shown in U.S. Pat. Nos. 6,134,718; 6,009,559; 5,790,987; 5,399,030; and 5,383,236, which have been incorporated herein by reference. This layer 23 would be for absorbing odors that are present on the surface to which the cover 20 rests, which odors are present before the cover 20 is placed over the seat 12.

Figure 3:
FIG. 3 is a perspective view of the present invention showing a bench seat cover and bucket seat covers constructed in accordance with the present invention and showing layers peeled back for illustrative purposes.
Figure 3:
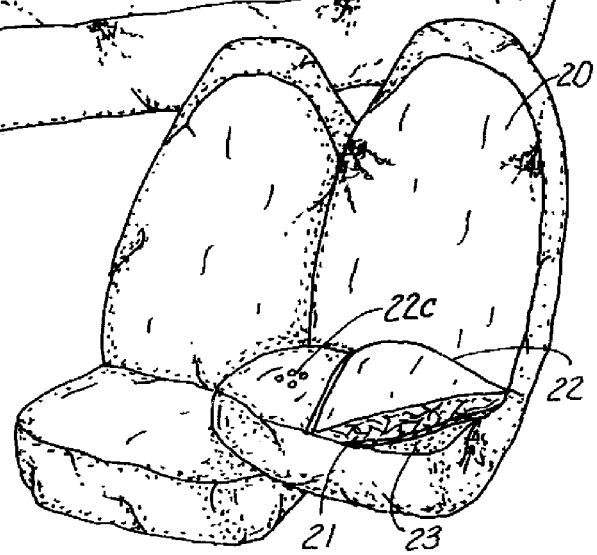

If the seat 12 is a full bench seat, then the seat cover 200, as shown in FIG. 3 would be the same basic two or three layer construction as explained above with respect to the seat cover 20.

The steering wheel cover 30 includes a seat vapor barrier such as wherein the polyethelene is preferably TUTUFF® polyethelene, TUTUFF® being cross-laminated virgin poly sheeting, made from high density resins. 21 over the top and front side of the steering wheel 13 to prevent odors from the steering wheel 13 to pass therethrough to a person's hands holding the steering wheel 13. A top layer 32 is preferably made of a material such as silk or RAYON® which will accept liquid or atomized sprays such as a cover scent such a acorn or earth/dirt scents, or merely a sanitizing spray which eliminates odors, such as indicated by numeral 32c, "c" standing for the word "coating". While only three droplets of spray 32c are shown in the drawings it is understood that preferably the entire top surface of layer 32 has the droplets 32c on it. Furthermore, the droplets 32c as shown in the drawings are greatly enlarged for illustrative purposes, wherein, in fact they would ideally be so small that they could not be seen with the naked eye. Cotton, for example would not be as suitable because it would absorb the coating 32c and would absorb other smells, odors and liquids that might be accidentally spilled thereon.

Optionally, a lower steering wheel layer 33 would ideally be a SCENT LOK® type of material, such as the type shown in U.S. Pat. Nos. 6,134,718; 6,009,559; 5,790,987; 5,399,030; and 5,383,236, which have been incorporated herein by reference. This layer 33 would be for absorbing odors that are present on the steering wheel surface to which the steering wheel cover 30 rests, which odors are present before the cover 30 is placed over the steering wheel 13.

The floor mat 14 includes a floor mat vapor barrier such as wherein the polyethelene is preferably TUTUFF® polyethelene, TUTUFF® being cross-laminated virgin poly sheeting, made from high density resins. 15 over the top of the floorboard 11 to prevent odors from the floorboard 11 to pass therethrough to a person having their boots on the floor board 11. A top layer of the floor mat 16 is preferably made of a material such as silk or RAYON® which will accept liquid or atomized sprays such as a cover scent such a acorn or earth/dirt scents, or merely a sanitizing spray which eliminates odors, such as indicated by numeral 16c, "c" standing for the word "coating". While only three droplets of spray 16c are shown in the drawings it is understood that preferably the entire top surface of layer 16 has the droplets 16c on it. Furthermore, the droplets 16c as shown in the drawings are greatly enlarged for illustrative purposes, wherein, in fact they would ideally be so small that they could not be seen with the naked eye. Cotton, for example, would not be as suitable because it would absorb the coating 16c and would absorb other smells, odors and liquids that might be accidentally spilled thereon.

Figure 4:
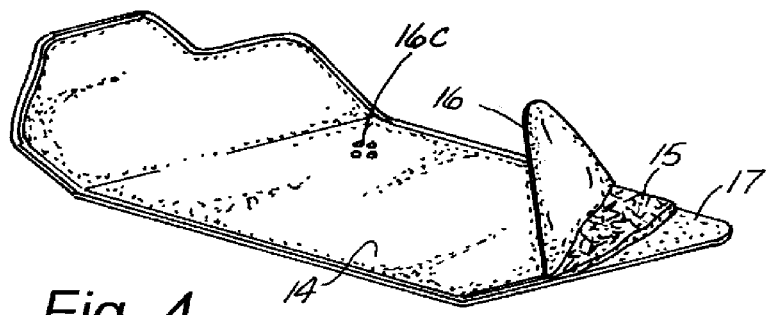
FIG. 4 is a perspective view of a floor mat constructed in accordance with the present invention and showing layers peeled back for illustrative purposes.

Optionally, a lower floor mat layer 17 a shown in FIG. 4 would ideally be constructed of a SCENT LOK® type of material, such as the type shown in U.S. Pat. Nos. 6,134,718; 6,009,559; 5,790,987; 5,399,030; and 5,383,236, which have been incorporated herein by reference. This layer 17 would be for absorbing odors that are present on the floor board surface 11 to over which the floor mat 14 rests, which odors are present before the floor mat 14 is placed over the floor board 11.

Figure 5:
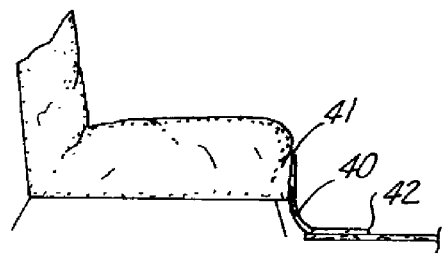
FIG. 5 is a side elevational view showing an alternative embodiment wherein an extension member is attached to the seat cover and to the floor mat.

FIG. 5 shows an extension piece 40 that can be just a sheet of any type of flexible material, or it can be of the two or three layer variety as seat cover 20, floor mat 14 or steering wheel cover 30. It (40) can be an integral part, the 'floor' portion 14 or it can be an 'extension' of the lower, front lip of the seat cover as shown in FIG. 5. As such, it could be 'rolled up' and secured by ties to the lower lip, if hunting boots were not being worn while driving. Or the 'extension' piece 40 can attach by snaps 41 or zipper 42 to the lower lip, or vice versa, and sold separately or bundled as a complete 'set' with the seat covers 20. The extension piece 40 would optimally be the same width as the floor mat 14, but that width is not critical to this invention. Alternatively, the snaps 41 and/or zipper 42 can interchangeably be hook and loop fasteners, such as VELCRO® brand fasteners or any other suitable substitute fastener.

As shown in FIGS. 1 and 4 the 'floor' portion could be totally or could be an integral part of the seat cover as shown in FIG. 3.

As an integral part, the 'floor' portion could be an 'extension' of the lower, front lip of the seat cover as shown in FIG. 5. As such, it could be 'rolled up' and secured by ties to the lower lip, if hunting boots were not being worn while driving; Or the 'extension' could attach by snaps or zipper to the lower lip and sold separately or bundled as a complete 'set' with the seat covers.

A three (3) layer scenario is shown in FIGS. 3 and 4 of the drawings.
1. The 'down' or 'bottom' side which might have a scent absorbing application like the 'carbon' in Scent Blocker items.
2. The 'middle' which would be the 'vapor barrier'.
3. And the 'top' side which could be an absorbent yet durable fabric. The 'Top' side could be impregnated during manufacturing, or treated by the consumer, with a 'cover scent' (Earth Scent or Acorn Scent); Or, could be left totally scent free (hunter's choice).

The bottom layer could be left off of each one of the seat, steering wheel cover and the floor mat, thereby producing a two (2) layer scenario.
1. The 'down' or 'bottom' side would be the 'vapor barrier' (like the rubber bottom on a bathroom floor mat).
2. And the 'top' side which could be an absorbent yet durable fabric. The 'Top' side could be impregnated during manufacturing, or treated by the consumer, with a 'cover scent' (Earth Scent or Acorn Scent). Or, could be left totally scent free.

Obviously many modifications and variations of the present invention are possible in light of the above teachings. It is therefore to be understood that, within the scope of the appended claims, the invention may be practiced otherwise than as specifically described.

The invention claimed is:

1. Apparatus for preventing transfer of odors from a vehicle to a hunter comprising:
    a self propelled vehicle having at least one seat, a floorboard and a steering wheel, the seat having a mostly horizontal portion with a top and a mostly vertical portion with a front side;
    a cover for the seat, the cover including a seat vapor barrier over the top and front side of the seat to prevent odors from the seat to pass therethrough;
    a seat material disposed on top of the seat vapor barrier; and
    a seat odor absorbing layer disposed below the seat vapor barrier wherein the seat odor absorbing layer comprises an agent being provided in the base layer and selected from the group consisting of activated charcoal, chlorophyll, baking soda, activated alumina, soda lime, zeolite, calcium oxide, and potassium permanganate.

2. The apparatus of claim 1 including:
    a floor mat disposed above the floorboard forward of the seat, the floor mat having a floor mat vapor barrier and a floor mat material disposed on top of the floor mat vapor barrier for being in contact with the hunter's foot wear.

3. The apparatus of claim 2 including a sheet operatively connected to a front lower part of the seat cover and to a rear portion of the floor mat.

4. The apparatus of claim 3 wherein at least one releasable fastener operatively attaches the sheet to the seat cover.

5. The apparatus of claim 3 wherein at least one releasable fastener attaches the sheet to the floor mat.

6. The apparatus of claim 3 wherein the sheet is integral with the seat cover and floor mat.

7. The apparatus of claim 6 including a floor mat odor absorbing layer disposed below the floor mat vapor barrier.

8. The apparatus of claim 1 wherein the seat material is treated with a cover scent.

9. The apparatus of claim 8 including:
    a cover for the steering wheel having a steering wheel vapor barrier covering that portion of the steering wheel that is touched while driving the vehicle; and
    a steering wheel material disposed over the steering wheel vapor barrier.

10. The apparatus of claim 1 including:
    a cover for the steering wheel having a steering wheel vapor barrier covering that portion of the steering wheel that is touched while driving the vehicle; and
    a steering wheel material disposed over the steering wheel vapor barrier.

11. The apparatus of claim 10 including a steering wheel odor absorbing layer disposed below the steering wheel vapor barrier.

12. The apparatus of claim 10 including:
    a floor mat disposed above the floorboard forward of the seat, the floor mat having a floor mat vapor barrier and a floor mat material disposed on top of the floor mat vapor barrier for being in contact with the hunter's foot wear.

13. Apparatus for preventing transfer of odors from a vehicle to a hunter comprising:
    a self propelled vehicle having at least one seat, a floorboard and a steering wheel, the seat having a mostly horizontal portion with a top and a mostly vertical portion with a front side;
    a floor mat disposed above the floorboard forward of the seat, the floor mat having a floor mat vapor barrier and a floor mat material disposed on top of the floor mat vapor barrier for being in contact with the hunter's foot wear; and
    a floor mat odor absorbing layer disposed below the floor mat vapor barrier.

14. The apparatus of claim 13 wherein the floor mat material is treated with a cover scent.

15. Apparatus for preventing transfer of odors from a vehicle to a hunter comprising:
    a self propelled vehicle having at least one seat, a floorboard and a steering wheel, the seat having a mostly horizontal portion with a top and a mostly vertical portion with a front side;
    a cover for the steering wheel having a steering wheel vapor barrier covering that portion of the steering wheel that is touched while driving the vehicle;
    a steering wheel material disposed over the steering wheel vapor barrier; and
    a steering wheel odor absorbing layer disposed below the steering wheel vapor barrier.

16. The apparatus of claim 15 wherein the steering wheel absorbent material is treated with a cover scent.

17. The apparatus of claim 1 wherein the seat material is silk or a semi-synthetic fiber.

18. The apparatus of claim 1 wherein the vapor barrier comprises polyethylene.

19. The apparatus of claim 18 wherein the polyethelene is cross-laminated virgin poly sheeting, made from high density resins.

* * * * *